United States Patent [19]

Andoh et al.

[11] Patent Number: 5,046,796
[45] Date of Patent: Sep. 10, 1991

[54] APPARATUS FOR CORRECTING SCANNING BEAMS ON BASIS OF TILTING OF SURFACE SEGMENTS OF POLYGONAL MIRROR USED IN SCANNING PATTERN DRAWING APPARATUS

[75] Inventors: Hiroaki Andoh; Michio Ohshima; Yuji Matsui; Takashi Okuyama; Toshitaka Yoshimura; Hidetaka Yamaguchi; Yasushi Ikeda; Jun Nonaka; Tamihiro Miyoshi; Mitsuo Kakimoto; Masatoshi Iwama; Hideyuki Morita; Satoru Tachihara; Akira Morimoto; Akira Ohwaki, all of Tokyo, Japan

[73] Assignee: Asahi Kogaku Kogyo K.K., Tokyo, Japan

[21] Appl. No.: 444,230

[22] Filed: Dec. 1, 1989

[30] Foreign Application Priority Data

Dec. 1, 1988 [JP] Japan .................... 63-304782

[51] Int. Cl.$^5$ .................................. G02B 26/10
[52] U.S. Cl. .................... 359/216; 250/236; 358/481
[58] Field of Search .............. 350/6.7, 6.8, 616; 358/481; 250/235, 236

[56] References Cited

U.S. PATENT DOCUMENTS

| | | | |
|---|---|---|---|
| 4,002,830 | 1/1977 | Brown et al. | 350/6.7 |
| 4,019,186 | 4/1977 | Dressen et al. | 346/108 |
| 4,270,131 | 5/1981 | Tompkins et al. | 346/108 |
| 4,404,590 | 9/1983 | Juergensen et al. | 358/481 |
| 4,776,654 | 10/1988 | Ishizuka et al. | 350/6.8 |

FOREIGN PATENT DOCUMENTS 2623728 5/1983 Fed. Rep. of Germany .

Primary Examiner—Loha Ben
Attorney, Agent, or Firm—Sughrue, Mion, Zinn, Macpeak & Seas

[57] ABSTRACT

An apparatus for correcting a scranning beam produced by a polygonal mirror tilting in small surface segments in each mirror surface segment caused by uneven mirror surfaces of the polygonal mirror. Data indicative of the amount of tilting in each of the surface segments is stored in a memory, which is addressed by a data signal indicative of the present scanning position of the polygonal mirror. Output data from the memory is applied to an acousto-optical modulator disposed in the beam path between the light source and the polygonal mirror.

4 Claims, 3 Drawing Sheets

5,046,796

APPARATUS FOR CORRECTING SCANNING BEAMS ON BASIS OF TILTING OF SURFACE SEGMENTS OF POLYGONAL MIRROR USED IN SCANNING PATTERN DRAWING APPARATUS

BACKGROUND OF THE INVENTION

The present invention relates to a scanning pattern drawing apparatus such as a laser photoplotter in which a laser beam issuing from a laser light source is directed to a rotating polygonal mirror which effects scanning of beam over the surface of a workpiece for drawing a pattern thereon. More particularly, the present invention relates to an improvement of the apparatus for correcting scanning beams on the basis of the tilting of surface segments caused by the uneven surface segments of the polygonal mirror used in the above-described type of scanning pattern drawing apparatus.

A known example of prior art scanning pattern drawing apparatus is a laser photoplotter in which a laser beam issuing from a laser light source is directed to a rotating polygonal mirror which effects scanning of the surface of a workpiece for drawing a pattern thereon. A laser photoplotter is required to be capable of drawing fine patterns. If, as shown in FIGS. 4 and 5, the surface segments 2 of the polygonal mirror are not perpendicular to a reference plane 3 (the angle of departure from the line normal to the reference plane is hereunder referred to as the angle of tilting $\theta$), laser beams $P_1$ and $P_2$ will be reflected in a direction that deviates by twice the angle of tilting from the normal direction in which the beams would be reflected in the absence of tilting ($\theta = 0$), as shown in FIG. 6. Consequently, the spots formed on the surface of the workpiece 4 by the reflected laser beams $P_1'$ and $P_2'$ serving as scanning beams will be offset from the normal positions not only in the direction of main scanning A but also in the direction of sub-scanning B. Under these circumstance, the tilting angle $\theta$ will vary from one surface segment of the polygonal mirror to another, making it impossible to draw fine patterns in a precise manner.

In order to avoid this problem, the polygonal mirror is conventionally machined in such a way that the angle of tilting $\theta$ of each surface segment is reduced to nearly zero. If this mechanical approach is not effective, the variations in the direction of reflection due to the difference in $\theta$ from one surface segment of the polygonal mirror to another are compensated electrically. Specifically, an acousto-optical (AO) modulator is controlled to deflect the laser beam emerging from the modulator in such a way that scanning laser beams $P_1$ and $P_2$ will not fluctuate in either direction of scanning on account of the difference in $\theta$ from one surface segment of the polygonal mirror to another.

In fact, however, the angle of tilting varies not only between individual surface segments of the polygonal mirror but also within each surface segment. Therefore, compensation for variations between surface segments is insufficient to allow the production of very fine patterns.

SUMMARY OF THE INVENTION

An object, therefore, of the present invention is to provide an apparatus for correcting scanning beams on the basis of the amount of tilting of the surface segments of a polygonal mirror used in a scanning pattern drawing apparatus. The correcting apparatus is capable of electrically controlling the direction of beam reflection within individual surface segments of the polygonal mirror, even if the angle of tilting varies within each surface segment of the mirror.

In accordance with this and other objects, the present invention provides an apparatus for correcting scanning beams on the basis of the amount of tilting of the surface segments of a polygonal mirror used in a scanning pattern drawing apparatus, comprising a light deflector disposed in the optical path of a light beam between a light source and a polygonal mirror and controlled by a control circuit in such a way that the beam emerging from the light deflector is deflected in a direction that allows the direction of beam reflection to be corrected in accordance with the angle of tilting of small areas into which each surface segment of the polygonal mirror is divided. This insures that the direction of beam reflection can be corrected to comply with the normal direction for each small area of the surface segments of the polygonal mirror.

DESCRIPTION OF THE PREFERRED EMBODIMENTS

The present invention will be described below with reference to the accompanying drawings that show an embodiment in which the scanning beam correcting apparatus of the invention is applied to a laser photoplotter.

Figure 2:
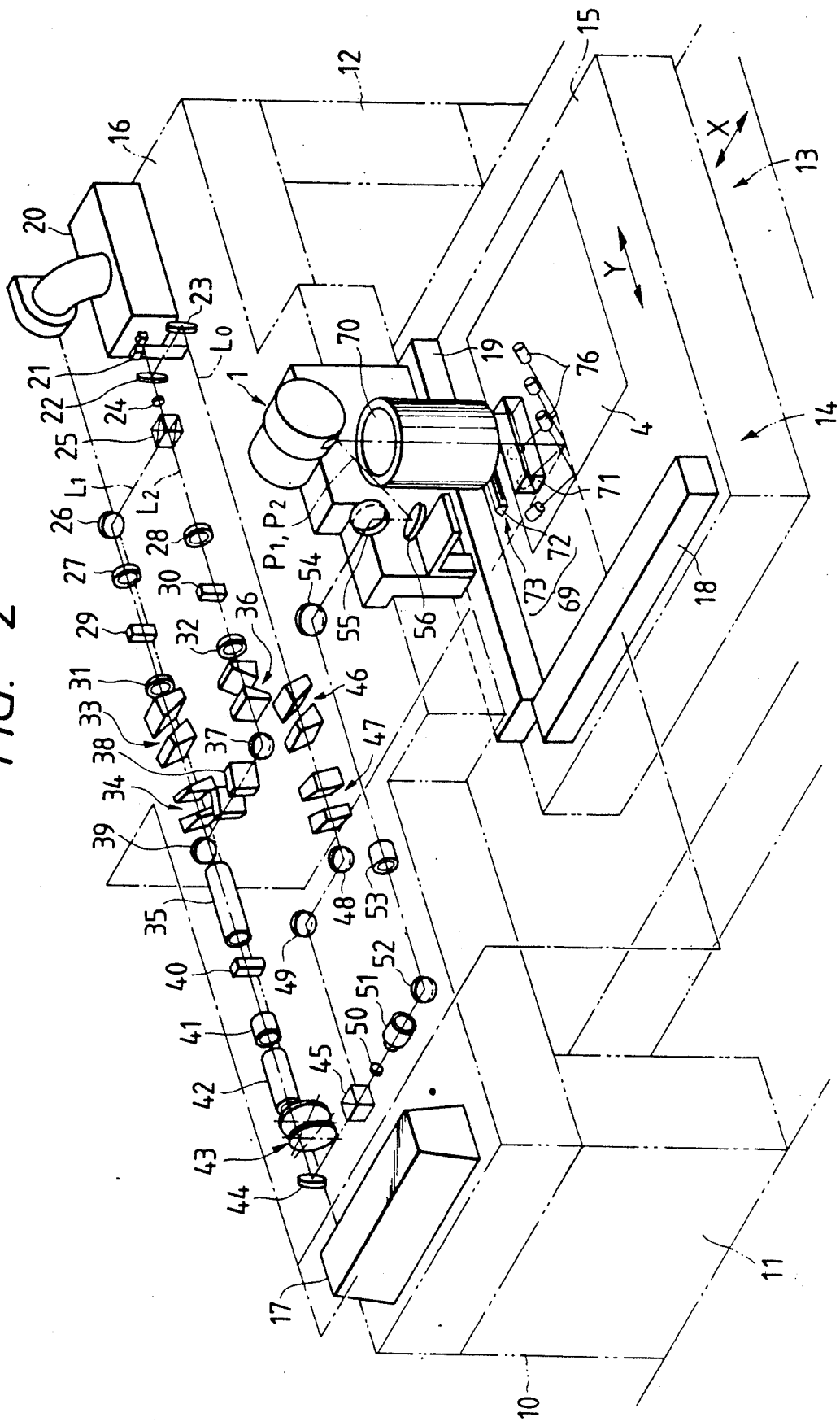
FIG. 2 is a perspective view showing schematically the construction of a laser photoplotter, which is an exemplar scanning pattern drawing apparatus.
Figure 4:
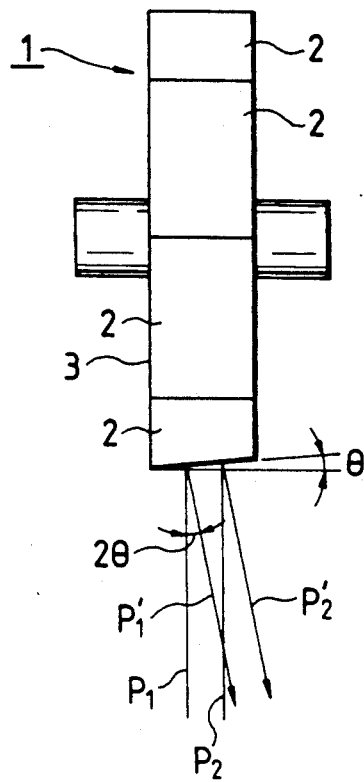
FIGS. 4 to 6 illustrate how the tilting of surface segments of the polygonal mirror causes a problem in a conventional scanning pattern drawing apparatus.
Figure 6:
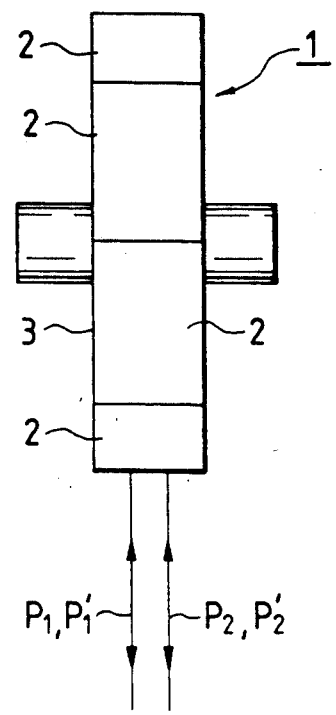

FIG. 2 is a diagram showing schematically the construction of the scanning pattern drawing apparatus. As shown therein, the apparatus includes a main body 10, legs 11 and 12 supporting the main body, an X table 13 slidable to reciprocate in the directions indicated by an arrow X, and a Y table 14 slidable to reciprocate in the directions indicated by arrow Y and which is equipped with a drawing board 15. The X table 13 and Y table 14 are positioned by means of a laser-operated measuring device which includes a laser light source 17 on the optical head unit 16 of the main body 10, an X-axis mirror 18, and a Y-axis mirror 19 mounted on the Y table 14. The beam issuing from the laser source 17 is split into two beamlets, which are directed to the respective mirrors 18 and 19 and reflected therefrom. Reception of the reflected beamlets enables positioning of the X and Y tables.

The optical head unit 16 has an additional laser light source 20. The laser beam issuing from this light source passes through a shutter 21 and is directed to a half-silvered mirror 22 which reflects about 5% of the incident light. The incident laser beam is thus split into two beamlets by means of the half-silvered mirror 22. One of the two beamlets is reflected toward a beam bender 23 to be used as monitor light $L_0$, whereas the other, predominant beamlet passes through the half-silvered mirror 22 and is directed toward a half-wavelength plate 24 to be used as a scanning beam, as will be described in more detail below.

The half-wavelength plate 24 rotates the direction of polarization of the laser light through 90° in such a way that an S-polarized component thereof is directed to an acousto-optical (AO) modulator (ultrasonic optical modulator using an acousto-optical device) and a P-polarized component is directed to a polarizing synthesizer. The laser light passing through the half-wavelength plate 24 is directed to a beam splitter 25 which divides the light into two beamlets, one of which is reflected as a pattern drawing beam $L_1$ which is directed to a lens 27 through a beam bender 26. The other beamlet passes through the beam splitter 25 and directed as a pattern drawing beam $L_2$ to a lens 28. Two pattern drawing beams, rather than a single beam, are used in the present invention in order to increase the pattern drawing speed.

The pattern drawing beams $L_1$ and $L_2$ are condensed by lenses 27 and 28, respectively, to converge at the positions where AO modulators 29 and 30 are located. The AO modulators are controlled by transducers (not shown) so as to turn on and off the generation of a dot-forming spot on the surface of a workpiece 4. Each of the pattern drawing beams $L_1$ and $L_2$ is divided into transmitted light and diffracted light by the associated AO modulator 29 or 30, with the primary diffracted light which emerges from the AO modulators being used for pattern drawing. The transducers are driven on the basis of dot pattern information to carry out exposure on the workpiece. Since the exposure information is stored in pattern memories (not shown) associated with respective individual scanning lines, each of the transducers is driven on the basis of successive pieces of exposure information delayed by one line.

The two beams of diffracted light are collimated by respective lenses 31 and 32. The primary diffracted light collimated by the lens 31 is deflected by a predetermined small angle as it passes through units 33 and 34 for fine tuning the optical axis. Each of the units 33 and 34 is composed of two prisms. The deflected light is directed to a lens unit 35. The primary diffracted light collimated by the lens 32 passes successively through a unit 36 provided for fine tuning the optical axis, a beam bender 37, a unit 38 provided for fine tuning the optical axis., and a beam bender 39, from which the diffracted light is directed to the lens unit 35. The axis tuning units 33, 34, 36 and 38 serve not only to separate a plurality of scanning beam spots on the surface of the workpiece by small amounts, but also to insure good convergence of each spot.

The pattern drawing beams $L_1$ and $L_2$ passing through the lens unit 35 are guided to an AO modulator 40 which compensates for the deviation of the reflected light from the normal direction of reflection which occurs on account of the tilting of surface segments of a polygonal mirror 1. Details of the manner in which this compensating AO modulator 40 is controlled will be described later in this specification, following an explanation of the optical paths of the pattern drawing beams $L_1$ and $L_2$ issuing from the modulator.

The pattern drawing beams $L_1$ and $L_2$ emerging from the compensating AO modulator 40 pass through a relay lens unit 41 and a lens unit 42 directed to a variable filter 43 provided for adjusting the quantity of light. The transmitted light has its optical path deflected by a beam bender 44 and directed to a polarizing synthesizer 45 which combines the optical path of the monitor light $L_0$ and those of the pattern drawing beams $L_1$ and $L_2$. The monitor light $L_0$ is directed to the synthesizer 45 after passing through optical axis tuning units 46 and 47 and beam benders 48 and 49. Since the monitor light $L_0$ enters the synthesizer 45 as an S-polarized component, it is reflected by the synthesizer and directed towards a half-wavelength plate 50. On the other hand, the pattern drawing beams $L_1$ and $L_2$ which enter the synthesizer 45 as P-polarized components, are first passed through the synthesizer 45 and then directed towards the half-wavelength plate 50. The lens units 35 and 42 form a beam expander which enlarges the incident pattern drawing beams $L_1$ and $L_2$ so that the diameter of the beams emerging from the lens unit 42 will be 1.67 times as large as the incident beams.

The direction of polarization of the pattern drawing beams $L_1$ and $L_2$ and the monitor light $L_0$ is rotated by the half-wavelength plate 50 through 90°. They thereafter are passed through a lens unit 51 and a beam bender 52 directed to a lens unit 53. The pattern drawing beams $L_1$ and $L_2$ and the monitor light $L_0$ that have passed through the lens unit 53 are deflected towards the polygonal mirror 1 by way of beam benders 54, 55 and 56 and reflected towards the surface of the workpiece 4 on the drawing board 15 by means of a surface segment 2 of the polygonal mirror 1. The lens units 51 and 53 function as a beam expander that enlarges the spots of the pattern drawing beams $L_1$ and $L_2$ and the monitor light $L_0$ to diameters about 21 times as large as the initial values, respectively. This is done in order to achieve maximum convergence of the beam spots by reducing their profiles on the surface of the workpiece 4. The relay lens unit 41 serves to render the compensating AO modulator 40 conjugative with each of the surface segments of the polygonal mirror 1. If the direction of the emerging diffracted light were changed by the AO modulator 40 in order to compensate for the deviation of the direction of reflection due to the angle of tilting, $\theta$, of the individual surface segments 2 of the polygonal mirror 1, then the area where light reflection occurs on a certain surface segment 2 of the polygonal mirror 1 would deviate from the area of reflection that occurred before the direction of the emerging diffracted light was changed. The relay lens unit 41 is used to avoid this problem.

Figure 1:
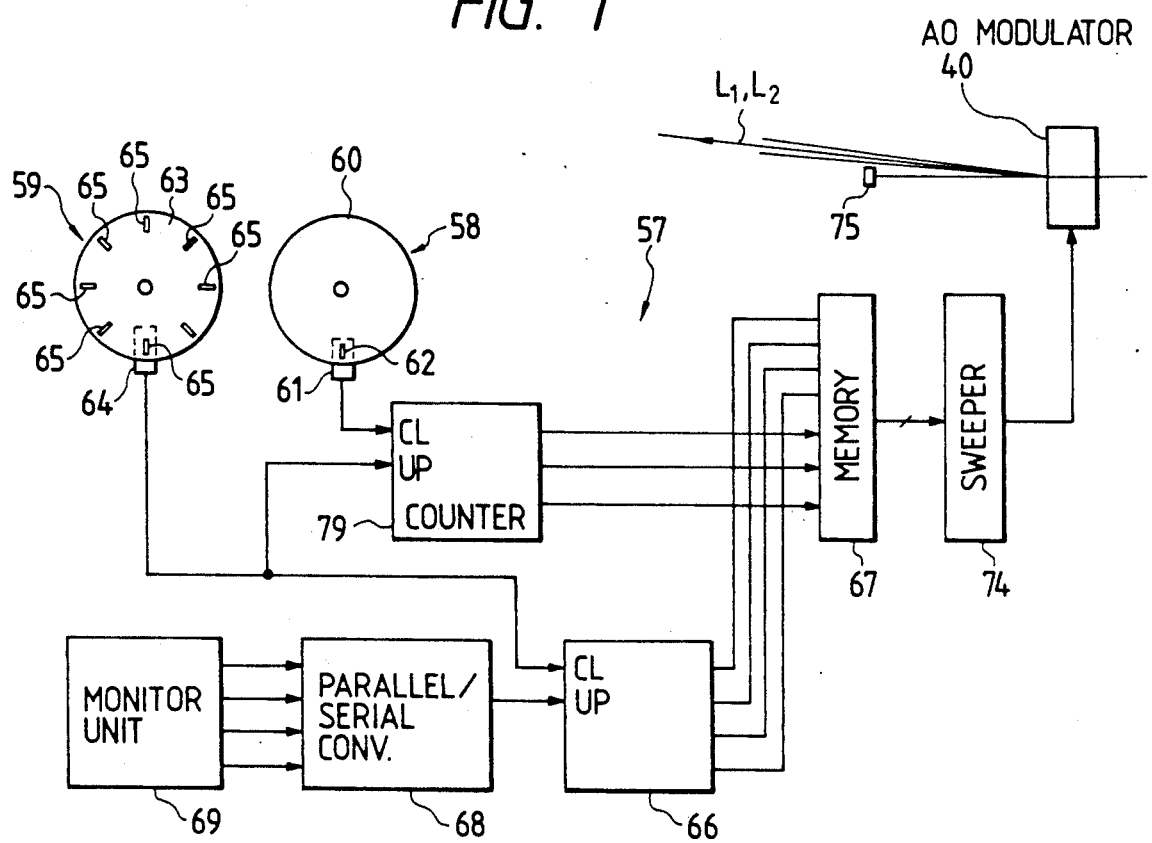
FIG. 1 is a control circuit diagram showing essential parts of an apparatus for correcting scanning beams on the basis of the amount of tilting of surface segments of the polygonal mirror in a scanning pattern drawing apparatus according to the present invention.

The compensating AO modulator 40 is controlled by the control circuit 57 shown in FIG. 1. Indicated by reference numeral 58 is a rotational position sensor provided for detecting one rotation of the polygonal mirror 1, and indicated by reference numeral 59 is a sensor provided for detecting the position of individual surface segments 2 of the polygonal mirror 1. The sensor 58 is composed of a rotating slit plate 60 and a light emitting/detecting element 61. A single slit 62 is formed in the plate 60. The sensor 59 is composed of a rotating slit plate 63 and a light emitting/detecting element 64. The plate 63 is provided with a plurality of slits 65 that are associated with the respective surface segments 2 of the polygonal mirror 1. Since the polygonal mirror 1 is assumed here to have eight surface segments, the plate 63 has eight slits 65.

The slit plates 60 and 63 rotate in unison with the polygonal mirror 1. The light emitting/detecting element 61 produces one pulse per revolution of the polygonal mirror 1, whereas the light emitting/detecting element 64 produces one pulse every time the mirror makes one-eighth of a revolution. The pulses produced by the light emitting/detecting element 61 are fed to the CLEAR terminal CL of a counter 79, whereas the pulses from the light emitting/detecting element 64 are supplied to the UP terminal of counter 79 and the CLEAR terminal CL of a counter 66.

Counters 79 and 66 designate an address in a memory 67 in a manner as described below. The content of the counter 79 is cleared in response to the inputting of a pulse from the light emitting/detecting element 61. Counter 79 counts up every time a pulse is supplied from the light emitting/detecting element 64, so that information about the rotational position of the polygonal mirror 1 is loaded into the memory 67. The UP terminal of the counter 66 is supplied with scanning address information from a monitor unit 69 via a parallel-to-serial converter 68. The scanning address information is generated on the basis of monitor light $L_0$. The monitor light $L_0$, after being reflected by a certain surface segment 2 of the polygonal mirror 1, passes through an fθ lens 70 and is directed to a beam splitter 71, from which it is reflected and directed to the monitor unit 69. The monitor unit 69 is composed of an elongated scale 72 extending in the scanning direction and a light-receiving fiber unit 73, with a stripe pattern being formed in the scale 72. The light-receiving fiber unit 73 detects the change in the quantity of transmitted monitor light $L_0$ and outputs pulses having a frequency proportional to the scanning speed. The pulses produced by the fiber unit 73 are used as scanning address information. The scanning address information obtained from the monitor unit 69 is also used to read data from the pattern memory.

Figure 5:
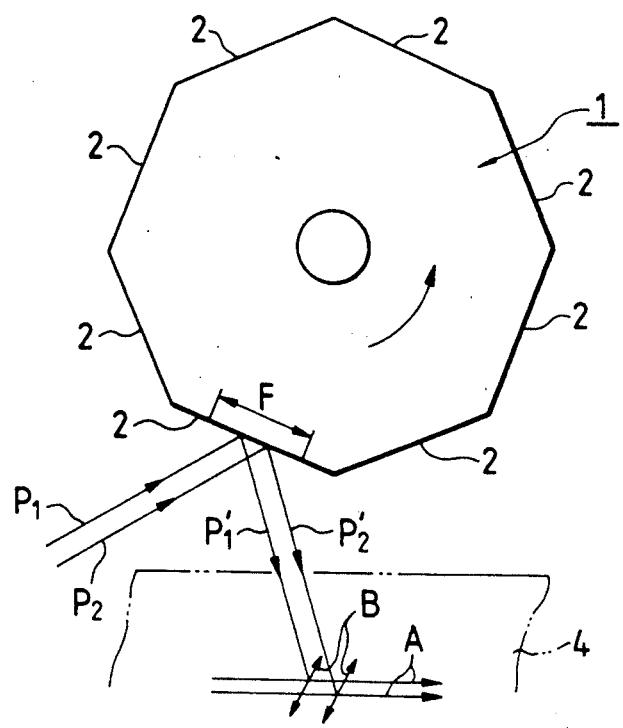

The content of the counter 66 is cleared in response to the inputting of a pulse from the light emitting-/detecting element 64, and the counter 66 counts up every time scanning address information is supplied as an output pulse from the monitor unit 69. The contents of counter 79 and 66 are used to designate an address in the memory 67. In other words, designation is made as to which one of the surface segments 2 of the polygonal mirror 1 is being used to scan the workpiece and as to which one of the small areas of that particular surface segment is taking part in beam reflection. It is assumed here that the effective region of each surface segment (which is used to reflect a light beam and is indicated by F in FIG. 5) is divided into three small areas of equal sizes in the direction in which the polygonal mirror 1 rotates, and that the memory 67 stores compensation data that is based on the tilting angle θ of each of such small areas. The compensation data can be obtained during manufacturing of the laser photoplotter by determining the amount of deviation of the direction of reflection due to θ through actual measurements.

Figure 3:
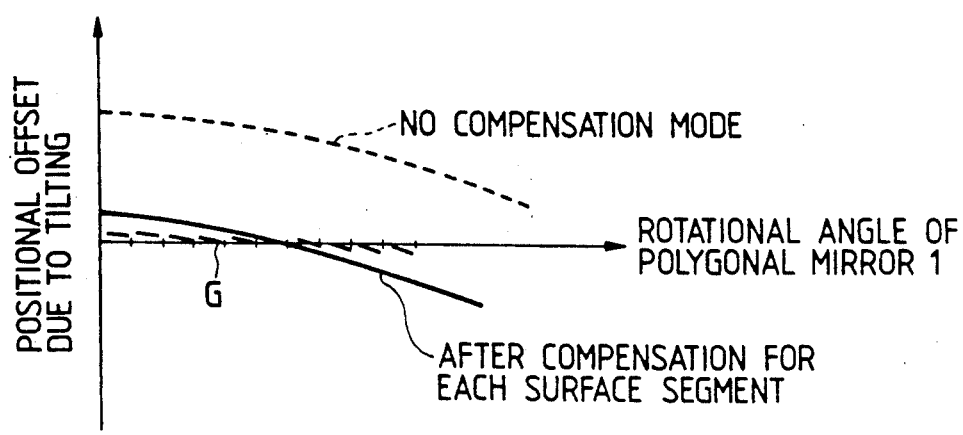
FIG. 3 is a graph illustrating the result of correcting scanning beams on the basis of the tilting of surface segments of the polygonal mirror according to the present invention.

When a certain surface segment 2 of the polygonal mirror 1 and a particular small area within the surface segment are designated, compensation data for the designated small area is produced from the memory 67 by means of a sweeper 74 which, on the basis of the output compensation data, changes the direction of the emerging beam in such a way that it complies with the normal direction ($L_1$ or $L_2$). The result is shown in FIG. 3 where the dashed line represents the deviation of a beam spot from the normal position which would occur in the direction of sub-scanning if no compensation were effected for the tilting of surface segments 2, where the solid line represents the deviation which would occur in the same direction when compensation is effected on the basis of such tilting. As indicated by G, the deviation from the normal position can be substantially eliminated by performing compensation for each of the small areas in each surface segment 2.

The scanning beam reflected from the polygonal mirror 1 is converged by the fθ lens 70 and it passes through the polarizing beam splitter 71 to form two spots $R_1$ and $R_2$ having a diameter of 5 μm on the surface of the workpiece 4. These two spots are spaced apart by a distance of 20 μm in the direction of main scanning and by 2.5 μm in the direction of sub-scanning, whereby the surface of the workpiece 4 is subjected to simultaneous scanning with two scanning beams.

Indicated by reference numeral 75 in FIG. 1 is a plate for shielding transmitted light. Indicated by reference numeral 76 in FIG. 2 is a focus detecting mechanism composed of an LED and a PSD and it is used to sense whether the surface of the workpiece is within the depth of focus of the fθ lens 70.

The apparatus for correcting scanning beams on the basis of the tilting of surface segments of the polygonal mirror used in a scanning pattern drawing apparatus is capable of electrically controlling the direction of beam reflection from individual small areas in each surface segment of the polygonal mirror even, if there are variations of the tilting angle within each surface segment. Consequently, the apparatus of the present invention has the advantage that the deviation of the direction of beam reflection due to the tilting of surface segments of the polygonal mirror can be corrected in a precise manner.

What is claimed is:

1. An apparatus for correcting a scanning beam produced by directing a light beam from a light source to a rotating polygonal mirror composed of a plurality of surface segments, comprising:

a light deflector disposed in an optical path of said light beam between said light source and said polygonal mirror;

means for correcting a direction of said scanning beam emerging from said polygonal mirror by applying to said light deflector a signal to compensate for tilting of a plurality of small areas within each of said surface segments;

wherein said correcting means comprises a memory for storing data indicative of an amount of tilting of each of said plurality of small areas;

wherein said correcting means further comprises means for addressing said memory with data indicative of a present position of said light beam from said light source on said polygonal mirror; and wherein said addressing means comprises means for producing a first pulse signal containing one pulse for each revolution of said polygonal mirror; means for producing a second pulse signal containing pulses indicative of edge positons of each of said surface segments; means for producing a third pulse signal containing pulses indicative of each of said plurality of small areas; first counter means receiving said first pulse signal as a clear signal and said second pulse signal as a count signal; and second counter means receiving said second pulse signal as a clear signal and said third pulse signal as a count signal, outputs of said first and second counter means together forming said data indicative of a present positon of said light beam from said light source on said polygonal mirror.

2. The apparatus for correcting a scanning beam of claim 1, wherein said means for producing said first and second pulse signals each comprise a rotating slit plate coupled to said polygonal mirror to rotate therewith and a light emitting/detecting element.

3. The apparatus for correcting a scanning beam of claim 1, wherein said means for producing said third pulse signal comprises: means for producing a monitor light beam scanned by said polygonal mirror; an elongated scale containing a stripe pattern and through which passes light from said monitor light beam scanned by said polygonal mirror; and a light-receiving fiber unit receiving light through said elongated scale for detecting a change in a quantity of monitor light and producing a signal containing pulses having a frequency proportional to a scanning speed of said scanning beam.

4. The apparatus for correcting a scanning beam of claim 1, wherein said light deflector comprises an acousto-optical modulator.

* * * * *